A. BECK & T. WARWICK.
Fellies for Vehicle-Wheels.
No. 209,216.                    Patented Oct. 22, 1878.
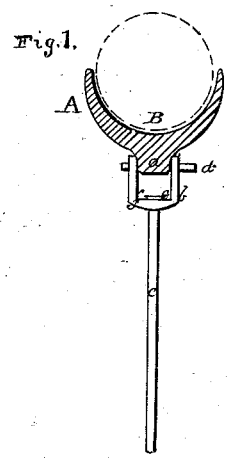
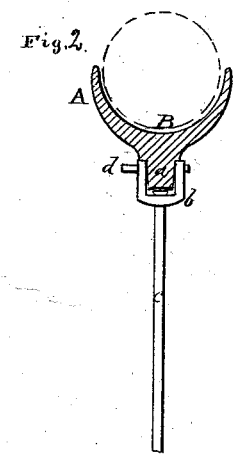
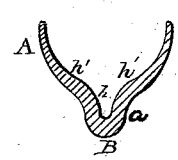
Attest.
H. L. Perrine
J. A. Rutherford
Alfred Beck.
Thomas Warwick.
Inventors.
By James L. Norris.
Atty

UNITED STATES PATENT OFFICE.

ALFRED BECK AND THOMAS WARWICK, OF BIRMINGHAM, ENGLAND.

IMPROVEMENT IN FELLIES FOR VEHICLE-WHEELS.

Specification forming part of Letters Patent No. 209,216, dated October 22, 1878; application filed March 18, 1878.

*To all whom it may concern:*

Be it known that we, ALFRED BECK and THOMAS WARWICK, of Birmingham, in the county of Warwick and Kingdom of England, have invented new and useful Improvements in Fellies and Tires for the Wheels of Bicycles and other Vehicles, of which the following is a specification:

The object of this invention is to provide a light-wheel felly provided with a peripheral groove for the reception of an elastic tire, and braced at the point of connection with the spokes, so as protect the fellies against injury from lateral strain.

To this end it consists in providing a concavo-convex felly with a flange or projection, which serves as a point of attachment for the spokes, and also as a brace for the wall of the felly.

In the accompanying drawing, Figure 1 represents a cross-section of my improved felly; Fig. 2, a similar view of a modification, and Fig. 3 a cross-section of still another modification thereof.

The letter A indicates a cross-section of the felly, which we prefer to make of metal. It is concavo-convex in form, being in fact a light shell, open outward, to receive and securely hold an elastic tire of rubber, rubber-covered cord, cork, or other suitable material. In order that, while making the felly light and hollow to receive the tire, it may be protected against injury from the strain of the spokes, we give it extra strength at its longitudinal center by increasing the thickness of the wall or plate toward that portion, as shown at B, and extending said portion downwardly, forming a flange, $a$, which also serves as a point of attachment for the spokes.

The modifications shown in Figs. 1, 2, and 3 are adapted to be pierced radially with respect to the wheel, but as in the ordinary manner. In Fig. 3 the contracted portion, $h$, of the concavity is intended to receive the ends of the spokes, and the shoulders $h'$ $h'$ support the tire clear of said ends, so that it will not be injured or displaced thereby.

In the forms illustrated by Figs. 1 and 2, cutting directly through the felly is avoided, and the flange $a$ is pierced transversely for the passage of a bolt, $d$, for securing a clip or stirrup, $b$, through which the end of the spoke $c$ passes, and may be retained by a head, $e$, or in any other suitable manner.

If found desirable, transverse bolts or pins may be passed through the contracted portion of the felly shown in Fig. 3 and through the ends of the spokes set therein, thereby adding to the strength of the wheel.

By using a felly constructed as herein described, a strong, light, and cheap wheel is produced, which is especially adapted for bicycles, buggies, and similar vehicles.

What we claim is—

A concavo-convex felly with a flange or projection, which serves as a point of attachment for the spokes, and also as a brace for the wall of the felly.

ALFRED BECK.
THOMAS WARWICK.

Witnesses:
EDWARD J. PAYNE,
PERCY J. B. PAYNE.